US012637964B1

(12) United States Patent
Thomas et al.

(10) Patent No.: US 12,637,964 B1
(45) Date of Patent: May 26, 2026

(54) REMOVABLE PIN RETENTION PLUGS FOR TURBINE SHROUD ASSEMBLIES

(71) Applicant: Rolls-Royce Corporation, Indianapolis, IN (US)

(72) Inventors: David J. Thomas, Indianapolis, IN (US); Clark Snyder, Indianapolis, IN (US); Ted J. Freeman, Indianapolis, IN (US); Aaron D. Sippel, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 19/294,001

(22) Filed: Aug. 7, 2025

(51) Int. Cl.
*F01D 25/24* (2006.01)

(52) U.S. Cl.
CPC ......... *F01D 25/243* (2013.01); *F01D 25/246* (2013.01); *F05D 2240/11* (2013.01); *F05D 2260/31* (2013.01)

(58) Field of Classification Search
CPC ..... F01D 25/246; F01D 11/08; F05D 2240/11
See application file for complete search history.

(56) References Cited

U.S. PATENT DOCUMENTS 7,494,317 B2 2/2009 Keller et al.
8,047,773 B2 11/2011 Bruce et al.
10,619,517 B2 4/2020 Quennehen et al.
10,655,501 B2 5/2020 Lepretre et al.
10,815,810 B2 10/2020 Barker et al.
11,021,990 B2 6/2021 Filippi
11,047,245 B2 6/2021 McCaffrey
11,053,817 B2 7/2021 Freeman et al.
11,066,947 B2 7/2021 Sippel et al.
11,073,045 B2 7/2021 Sippel et al.
11,174,747 B2 11/2021 Thill et al.
11,215,081 B2 1/2022 Schilling et al.
11,255,209 B2 2/2022 Clark et al.
11,286,812 B1 3/2022 Freemal et al.
11,378,012 B2 7/2022 Whittle et al.
11,466,585 B2 10/2022 Arbona et al.
11,629,607 B2 4/2023 Freeman et al.
11,732,604 B1 8/2023 Freeman et al.
11,773,751 B1 * 10/2023 Freeman ................. F01D 11/08 415/173.1
11,885,225 B1 1/2024 Freemal et al.
12,152,499 B1 11/2024 Thomas et al.
12,158,072 B1 12/2024 Sippel et al.
12,188,365 B1 1/2025 Thomas et al.
(Continued)

*Primary Examiner* — Justin D Seabe
(74) *Attorney, Agent, or Firm* — Barnes & Thornburg

(57) ABSTRACT

A turbine shroud assembly includes a carrier segment, a blade track segment, and a mount assembly. The carrier segment includes an outer wall, a first flange that extends radially inward from the outer wall, and a second flange axially spaced apart from the first flange and extending radially inward from the outer wall. The blade track segment includes a shroud wall and an attachment feature that extends radially outward from the shroud wall. The mount assembly includes a pin that extends axially into the second flange, through the attachment feature, and into the first flange so as to couple the blade track segment to the carrier segment and a pin retention plug that is press fit into the second flange axially aft of the pin to block removal of the pin through the second flange.

17 Claims, 5 Drawing Sheets

(56) References Cited

U.S. PATENT DOCUMENTS

| | | | |
|---|---|---|---|
| 12,196,100 | B1 | 1/2025 | Wu et al. |
| 12,286,885 | B1 | 4/2025 | Sippel et al. |
| 2025/0179935 | A1 | 6/2025 | Thomas et al. |

* cited by examiner

REMOVABLE PIN RETENTION PLUGS FOR TURBINE SHROUD ASSEMBLIES

FIELD OF THE DISCLOSURE

The present disclosure relates generally to gas turbine engines, and more specifically to turbine shroud assemblies adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high-pressure air and is ignited. Products of the combustion reaction in the combustor are directed into the turbine where work is extracted to drive the compressor and a fan, a propeller, or an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to high temperatures. In some examples, coupling such components with traditional fasteners such as rivets or bolts may not allow for the differing levels of expansion and contraction during operation of the gas turbine engine.

SUMMARY

The present disclosure may comprise one or more of the following features and combinations thereof.

A turbine shroud assembly for use with a gas turbine engine may comprise a carrier segment, a blade track segment, and a mount assembly. The carrier segment may be arranged to extend circumferentially at least partway around an axis. The carrier segment may include an outer wall, a first flange that extends radially inward from the outer wall, and a second flange spaced apart axially aft from the first flange and extending radially inward from the outer wall. The blade track segment may be supported by the carrier segment to define a portion of a gas path of the turbine shroud assembly. The blade track segment may include a shroud wall that extends circumferentially partway around the axis, a first attachment flange that extends radially outward from the shroud wall, and a second attachment flange axially spaced apart from the first attachment flange and extending radially outward from the shroud wall. The mount assembly may include a first pin that extends axially into a first aperture formed in the second flange of the carrier segment, through the first attachment flange and the second attachment flange, and into the first flange of the carrier segment so as to couple the blade track segment to the carrier segment and a first pin retention plug that is press fit into the first aperture of the second flange of the carrier segment axially aft of the first pin and circumferentially aligned with the first pin to block removal of the first pin through the first aperture in the second flange. The first pin retention plug may extend between a first axial end that abuts the first pin and a second axial end opposite the first axial end and aligned with an axially-aft facing surface of the second flange of the carrier segment. The first pin retention plug may be formed to include a removal aperture that extends into the first pin retention plug from the second axial end thereof toward the first axial end.

In some embodiments, the first pin retention plug may have a constant diameter along an axial length of the first pin retention plug. The first pin retention plug may have a circular cross-sectional shape. In some embodiments, the first pin may include a forward pin segment that extends axially into the first flange of the carrier segment and through the first attachment flange and an aft pin segment that extends through the second attachment flange and the second flange of the carrier segment.

In some embodiments, the carrier segment may further include a third flange located axially between the first flange and the second flange and extending radially inward from the outer wall and a fourth flange located axially between the third flange and the second flange and extending radially inward from the outer wall. The forward pin segment may extend through the third flange and the aft pin segment may extend through the fourth flange.

In some embodiments, the first aperture may be defined by a first portion and a second portion axially aft of the first portion. The first portion may have a first diameter and the second portion may have a second diameter that is greater than the first diameter. The first pin may be located in the first portion of the first aperture and the first pin retention plug may be located in the second portion of the first aperture.

In some embodiments, the removal aperture of the first pin retention plug may be formed to include threads to aid in removal of the first pin retention plug from the first aperture. In some embodiments, the removal aperture may not extend entirely axially through the first pin retention plug. In some embodiments, the mount assembly may further include a second pin that extends axially into a second aperture formed in the second flange of the carrier segment, through the first attachment flange and the second attachment flange, and into the first flange of the carrier segment so as to couple the blade track segment to the carrier segment and a second pin retention plug that is press fit into the second aperture of the second flange of the carrier segment axially aft of the second pin and circumferentially aligned with the second pin to block removal of the second pin through the second aperture in the second flange. The second pin and the second pin retention plug may be circumferentially spaced apart from the first pin and the first pin retention plug, respectively.

According to another aspect of the present disclosure, a turbine shroud assembly for use with a gas turbine engine may comprise a carrier segment, a blade track segment, and a mount assembly. The carrier segment may include an outer wall, a first flange that extends radially inward from the outer wall, and a second flange spaced apart axially aft from the first flange and extending radially inward from the outer wall. The blade track segment may be supported by the carrier segment and may include a shroud wall and an attachment feature that extends radially outward from the shroud wall. The mount assembly may include a pin that extends axially into an aperture formed in the second flange of the carrier segment, through the attachment feature, and into the first flange of the carrier segment so as to couple the blade track segment to the carrier segment and a pin retention plug that is press fit into the aperture of the second flange of the carrier segment axially aft of the pin and circumferentially aligned with the pin to block removal of the pin through the aperture in the second flange. The pin retention plug may extend between a first axial end facing the pin and a second axial end opposite the first axial end. The pin retention plug may be formed to include a removal aperture that extends into the pin retention plug from the second axial end thereof toward the first axial end.

In some embodiments, the pin retention plug may have a constant diameter along an axial length of the pin retention plug. The attachment feature of the blade track segment may include a first attachment flange that extends radially outward from the shroud wall and a second attachment flange axially spaced apart from the first attachment flange and extending radially outward from the shroud wall. The pin may include a forward pin segment that extends axially into the first flange of the carrier segment and through the first attachment flange and an aft pin segment that extends through the second attachment flange and the second flange of the carrier segment.

In some embodiments, the carrier segment may further include a third flange located axially between the first flange and the second flange and extending radially inward from the outer wall and a fourth flange located axially between the third flange and the second flange and extending radially inward from the outer wall. The forward pin segment may extend through the third flange and the aft pin segment may extend through the fourth flange.

In some embodiments, the removal aperture of the pin retention plug may be formed to include threads to aid in removal of the pin retention plug from the aperture. The removal aperture may not extend entirely axially through the pin retention plug.

A method may comprise arranging a blade track segment adjacent a carrier segment to support the blade track segment radially inward of the carrier segment. The carrier segment may include an outer wall, a first flange that extends radially inward from the outer wall, and a second flange spaced apart axially aft from the first flange and extending radially inward from the outer wall. The blade track segment may include a shroud wall, a first attachment flange that extends radially outward from the shroud wall, and a second attachment flange axially spaced apart from the first attachment flange and extending radially outward from the shroud wall. The method may comprise inserting a pin into an aperture of the second flange, through the second attachment flange, through the first attachment flange, and into the first flange so as to couple the blade track segment to the carrier segment. The method may comprise inserting a pin retention plug into the aperture aft of the pin after inserting the pin to block removal of the pin through the aperture of the second flange. The pin retention plug may extend between a first axial end that abuts the pin and a second axial end opposite the first axial end. The pin retention plug may be formed to include a removal aperture that extends into the pin retention plug from the second axial end thereof toward the first axial end.

In some embodiments, the removal aperture of the pin retention plug may be formed to include threads to aid in removal of the pin retention plug from the aperture. The second axial end of the pin retention plug may be axially aligned with an axially-aft facing surface of the second flange of the carrier segment.

These and other features of the present disclosure will become more apparent from the following description of the illustrative embodiments.

DETAILED DESCRIPTION

Figure 1:
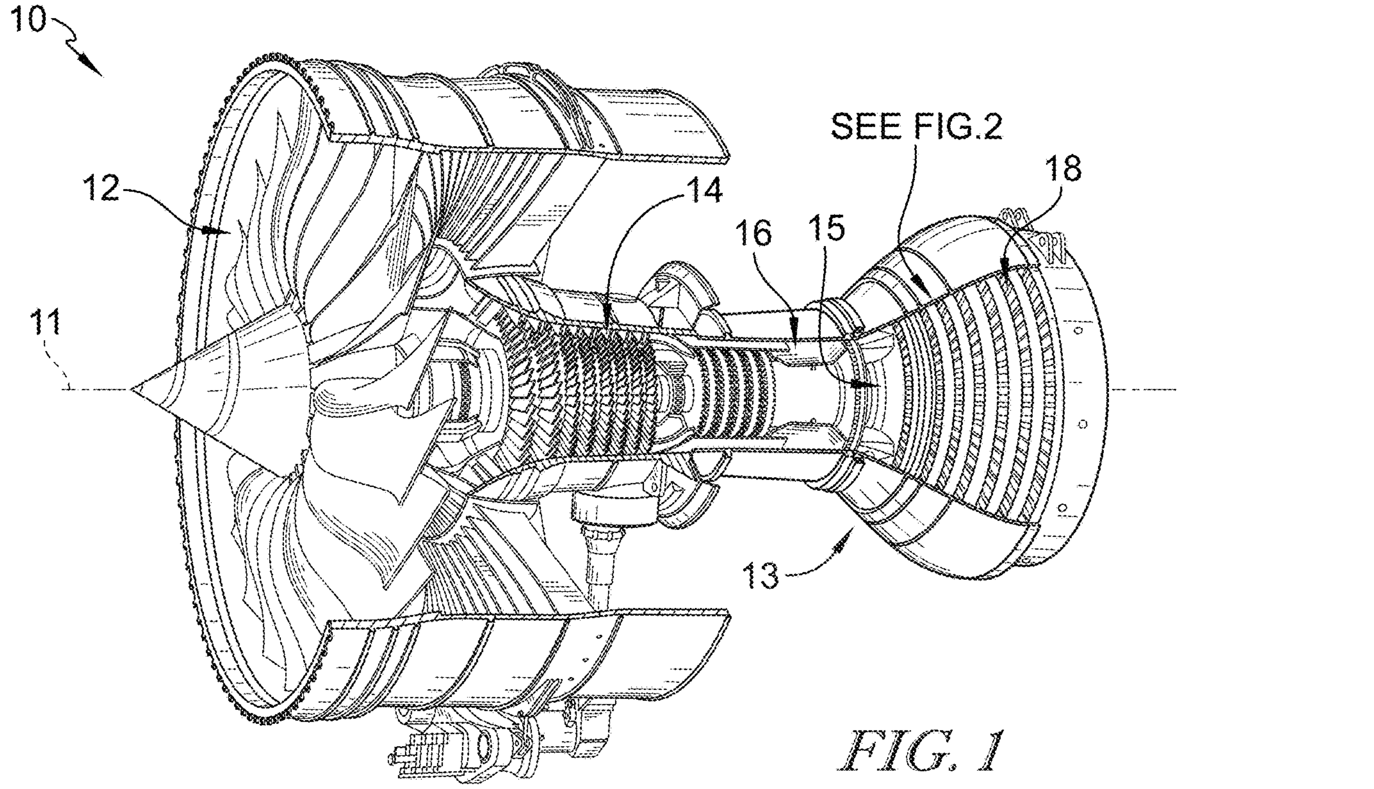
FIG. 1 is a cutaway perspective view of a gas turbine engine showing that the exemplary engine includes a fan, a compressor, a combustor, and a turbine, the turbine including turbine shroud assemblies that extend circumferentially around an axis and turbine wheel assemblies that are driven to rotate about the axis of the gas turbine engine to generate power.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, a compressor 14, a combustor 16, and a turbine 18, as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan 12 may be replaced with a propeller, drive shaft, or other suitable configuration.

Figure 2:
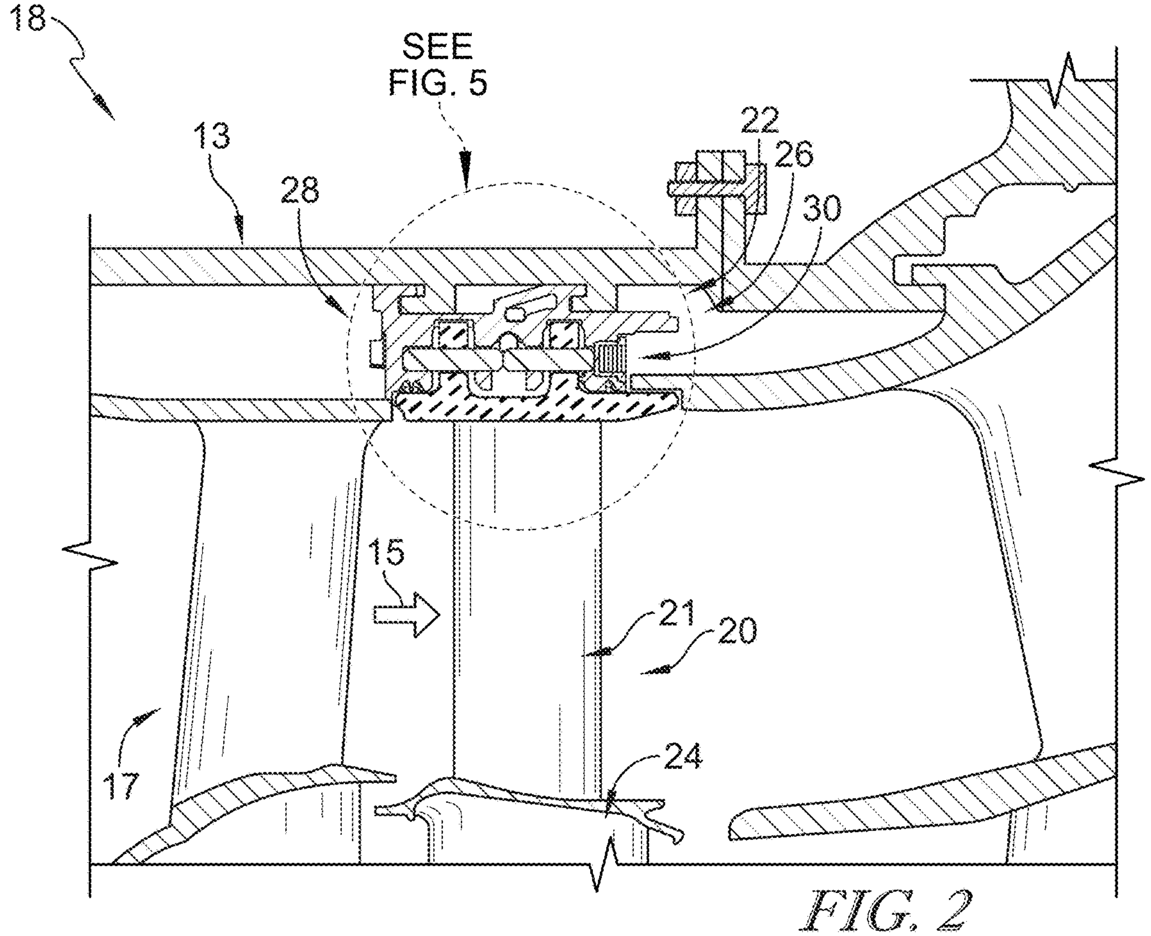
FIG. 2 is a cross-sectional view of a portion of the turbine included in the gas turbine engine of FIG. 1 showing a turbine shroud assembly arranged around one of the turbine wheel assemblies, the turbine shroud assembly including a carrier segment, a blade track segment that defines a portion of a gas path of the turbine shroud assembly, and a mount assembly having a pin that couples the blade track segment to the carrier segment and a pin retention plug that is press fit into the carrier segment axially aft of the pin to block removal of the pin.

The turbine 18 includes turbine wheel assemblies 20 and turbine shroud assemblies 22 positioned to surround the turbine wheel assemblies 20, as shown in FIGS. 1 and 2. The turbine wheel assemblies 20 include a plurality of blades 21 coupled to a rotor disk 24 for rotation with the rotor disk 24. The hot, high-pressure combustion products from the combustor 16 are directed toward the blades 21 of the turbine wheel assemblies 20 along a gas path 15. The turbine wheel assemblies 20 further include a plurality of vanes 17, as shown in FIG. 2. The turbine shroud assemblies 22 are coupled to an outer case 13 of the gas turbine engine 10 and extend around the turbine wheel assemblies 20 to block gases from passing over the blades 21 during use of the turbine 18 in the gas turbine engine 10.

The turbine shroud assemblies 22 are arranged adjacent to one another with a plurality of seals 31 arranged between adjacent turbine shroud assemblies 22 so that the turbine shroud assemblies 22 extend entirely circumferentially about the axis 11. Each of the turbine shroud assemblies 22 includes a carrier segment 26, a blade track segment 28, and a mount assembly 30, as shown in FIGS. 2-6. The carrier segment 26 is made of metallic materials and arranged circumferentially around the axis 11. The blade track segment 28 is made of ceramic matrix composite materials and is supported by the carrier segment 26 to locate the blade track segment 28 radially outward of the axis 11 to define a portion of the gas path 15. The mount assembly 30 is configured to couple the blade track segment 28 to the carrier segment 26, while also locating the blade track segment 28 relative to the carrier segment 26 to improve sealing between the blade track segment 28 and the carrier segment 26.

Figure 4:
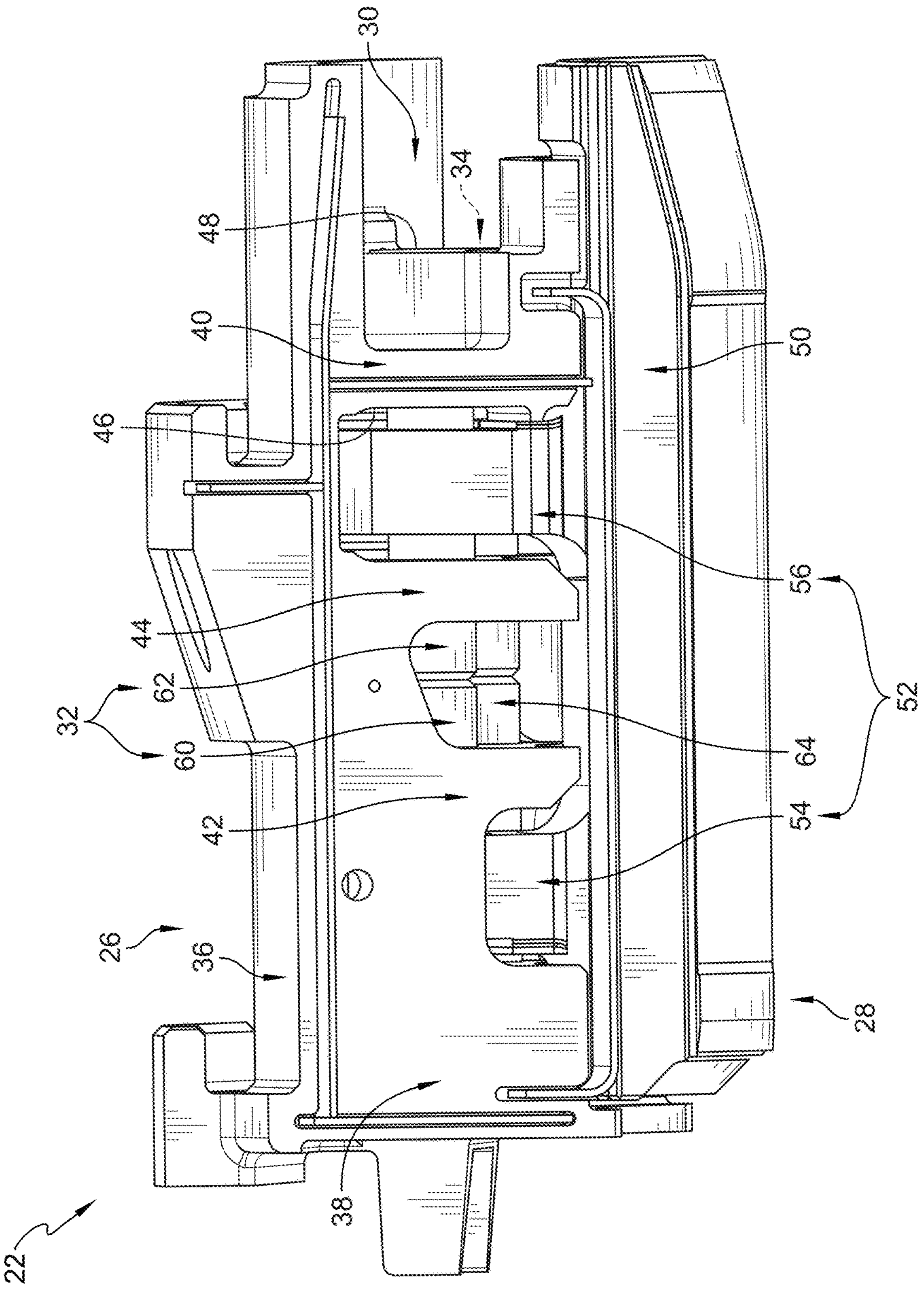
FIG. 4 is a side view of the turbine shroud assembly of FIG. 3 showing that the pin retention plug is substantially flush with the aftmost flange of the carrier segment such that the pin retention plug does not extend axially aft beyond the aftmost flange of the carrier segment.
Figure 5:
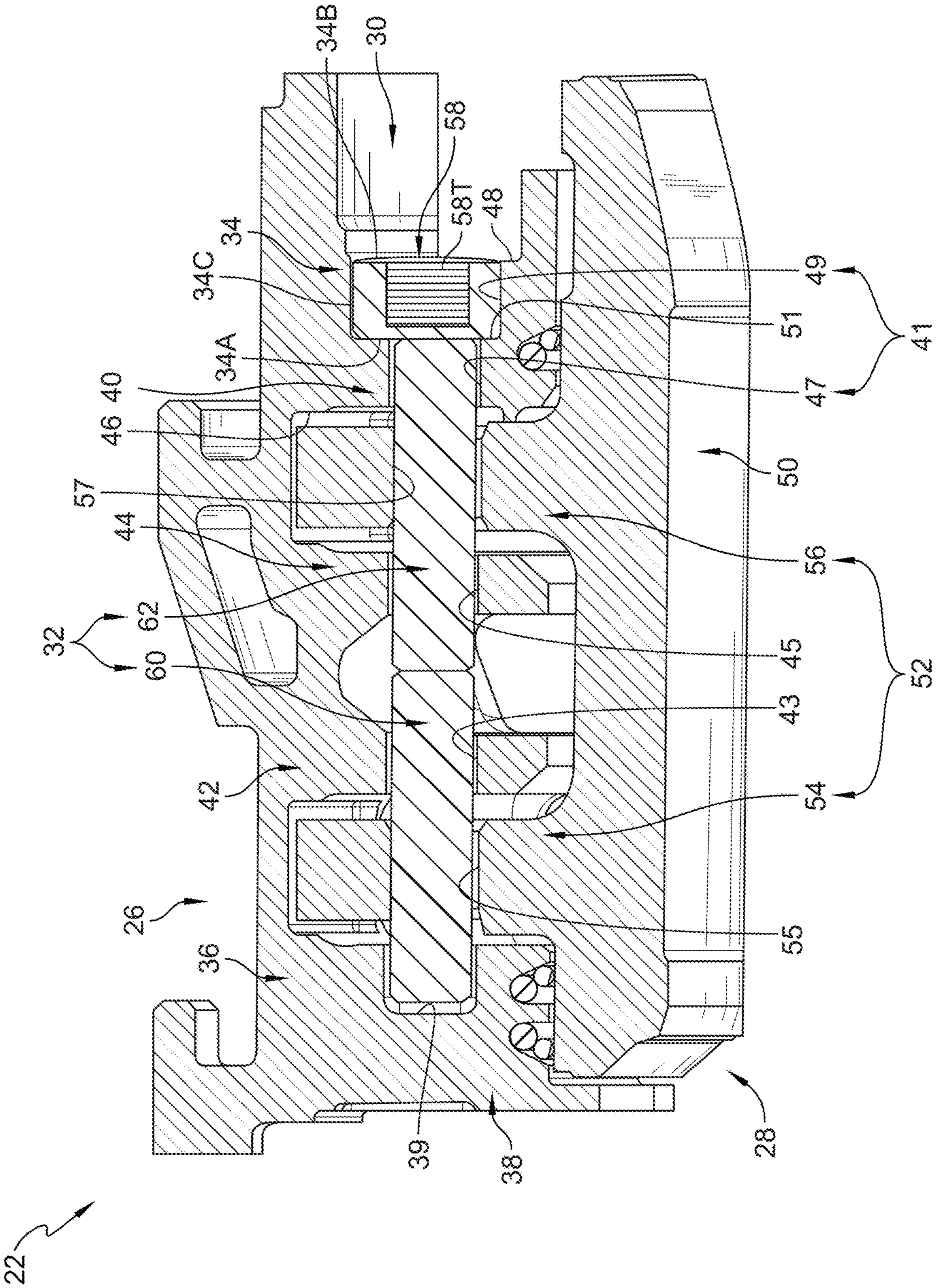
FIG. 5 is a cross-sectional view of the turbine shroud assembly of FIG. 4 showing that the pin extends through flanges of the carrier segment and attachment flanges of the blade track segment to couple the blade track segment to the carrier segment and the pin retention plug engages an aftmost end of the pin to block axial movement of the pin.
Figure 6:
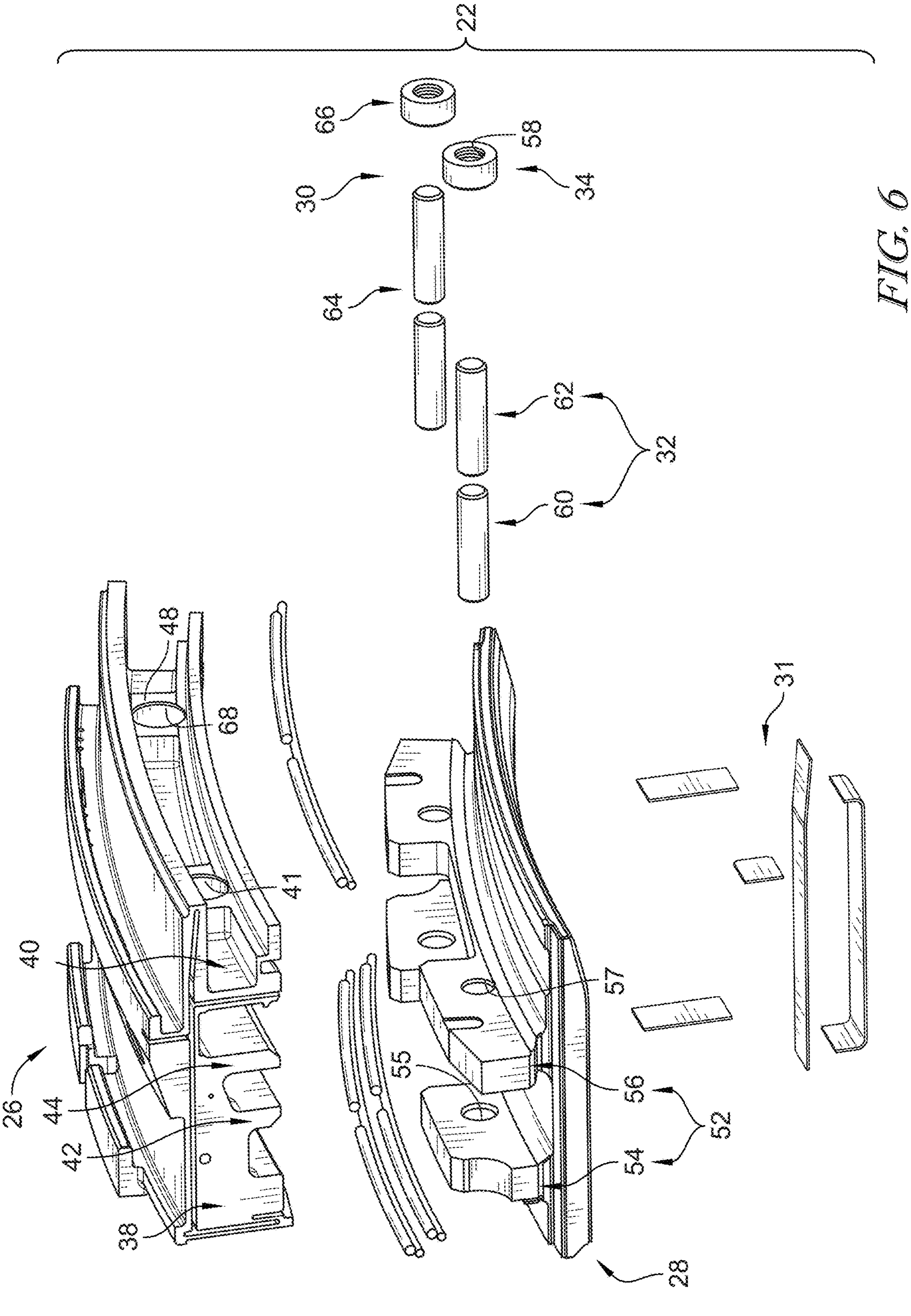
FIG. 6 is an exploded view of the turbine shroud assembly of FIG. 3 showing that the turbine shroud assembly includes the carrier segment, the blade track segment, and the mount assembly having two pins configured to extend axially through the carrier segment and the blade track segment to couple the blade track segment to the carrier segment and two pin retention plugs configured to be press fit into the aftmost flange of the carrier segment to block removal of the pins.

The mount assembly 30 includes a first pin 32 and a first pin retention plug 34, as shown in FIGS. 4-6. The first pin 32 extends into the carrier segment 26 and the blade track segment 28 to couple the blade track segment 28 to the carrier segment 26. The first pin retention plug 34 is press fit into the carrier segment 26 axially aft of the first pin 32 and circumferentially aligned with the first pin 32 to block removal of the first pin 32 from the carrier segment 26 and the blade track segment 28 and to block axial movement of the first pin 32 relative to the carrier segment 26 and the blade track segment 28.

In the illustrative embodiment, the blade track segment 28 comprises ceramic matrix composite materials, while the carrier segment 26 comprises metallic materials. Ceramic matrix composite materials can generally withstand higher temperatures than metallic materials. Therefore, the ceramic matrix composite blade track segment 28 may allow for increased temperatures within the turbine 18 as well as decreased cooling air usage such that the overall efficiency of the gas turbine engine 10 can be improved.

However, ceramic matrix composite materials may have a relatively low strength compared to the surrounding support structures of the turbine 18, such as the metallic carrier segment 26. Additionally, the ceramic matrix composite materials of the blade track segment 28 and the metallic materials of the carrier segment 26 grow and shrink at different rates when exposed to high and low temperatures due to the differing coefficients of thermal expansion of the materials. Therefore, methods of coupling the blade track segment 28 to the carrier segment 26 may be challenging.

In the illustrative embodiment, the turbine shroud assembly 22 includes the first pin 32 to couple the blade track segment 28 to the carrier segment 26. To insert the first pin 32 into the carrier segment 26 and the blade track segment 28, the carrier segment 26 may include holes to insert the first pin 32 through. However, the carrier segment 26 may need another component to close the holes once the first pin 32 is inserted and to maintain the position of the first pin 32 within the holes. Therefore, the turbine shroud assembly 22 includes the first pin retention plug 34 to prevent axial movement of the first pin 32 during operation of the gas turbine engine 10.

Figure 3:
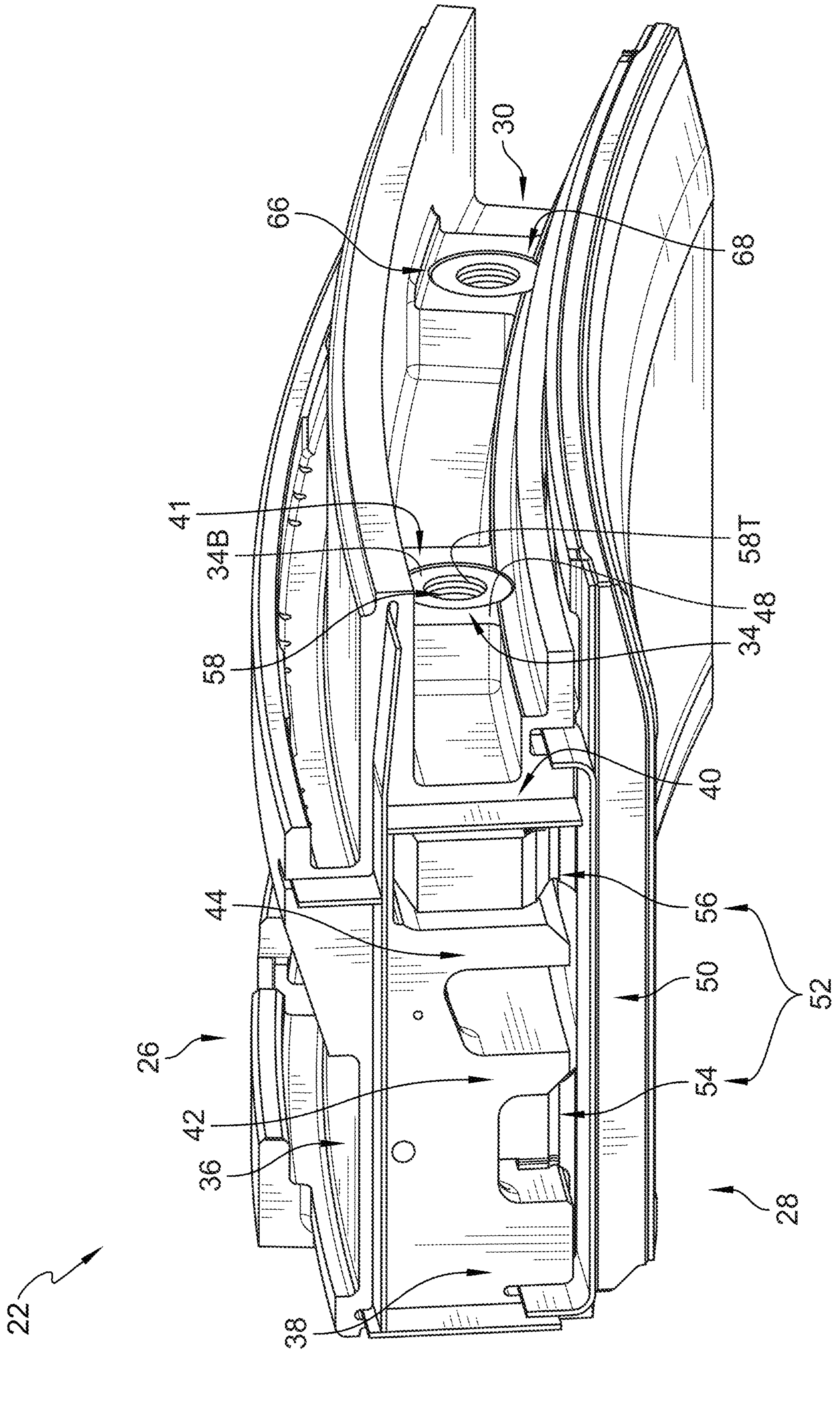
FIG. 3 is a perspective view of the turbine shroud assembly of FIG. 2 showing that the pin retention plug is press fit into an aftmost flange of the carrier segment and includes a removal aperture configured to receive a removal tool therein to assist in removal of the pin retention plug from the carrier segment.

The carrier segment 26 includes an outer wall 36 and a plurality of flanges 38, 40, 42, 44, as shown in FIGS. 3-5. The outer wall 36 extends circumferentially partway around the axis 11. The plurality of flanges 38, 40, 42, 44 extend radially inward from the outer wall 36 and have a circumferential extent that extends along the circumferential extent of the outer wall 36.

The plurality of flanges 38, 40, 42, 44 includes a first flange 38 and a second flange 40, as shown in FIGS. 3 and 4. The second flange 40 is located axially aft of the first flange 38. In the illustrative embodiment, the first flange 38 is located at an axially forward end of the outer wall 36 and the second flange 40 is located near an axially aft end of the outer wall 36.

The plurality of flanges 38, 40, 42, 44 also includes a third flange 42 and a fourth flange 44, as shown in FIGS. 3 and 4. The third flange 42 is located axially between the first flange 38 and the fourth flange 44, and the fourth flange 44 is located axially between the third flange 42 and the second flange 40. The third and fourth flanges 42, 44 may be inner flanges or clevises that are both located axially inward of the first flange 38 and the second flange 40.

The plurality of flanges 38, 40, 42, 44 is each formed to include a corresponding aperture 39, 41, 43, 45 that receives the first pin 32 when the first pin 32 is inserted into the carrier segment 26 and through the blade track segment 28, as shown in FIG. 5. The first flange 38 is formed to include an aperture 39 that extends axially into the first flange 38 from an axially aft face of the first flange 38 toward an axially forward face of the first flange 38. The second flange 40 is formed to include an aperture 41 that extends entirely axially through the second flange 40. The third flange 42 is formed to include an aperture 43 that extends entirely axially through the third flange 42. The fourth flange 44 is formed to include an aperture 45 that extends entirely axially through the fourth flange 44.

The first pin 32 extends through the aperture 41, through the aperture 45, through the aperture 43, and into the aperture 39 when the first pin 32 is inserted into the carrier segment 26 and through the blade track segment 28, as shown in FIG. 5. The aperture 39 is formed as a blind hole that receives a forward end of the first pin 32 therein when the first pin 32 is inserted into the carrier segment 26 and through the blade track segment 28. In this way, the first pin 32 does not extend entirely axially through the first flange 38 of the carrier segment 26.

The second flange 40 extends between an axially-forward facing surface 46 and an axially-aft facing surface 48, as shown in FIGS. 4 and 5. The axially-forward facing surface 46 faces toward the fourth flange 44, and the axially-aft facing surface 48 faces away from the fourth flange 44. The aperture 41 of the second flange 40 extends entirely axially between and through the axially-forward facing surface 46 and the axially-aft facing surface 48.

The aperture 41 of the second flange 40 is defined by a first portion 47 and a second portion 49 axially aft of the first portion 47, as shown in FIG. 5. The first portion 47 has a first diameter and the second portion 49 has a second diameter that is greater than the first diameter. The first portion 47 of the aperture 41 is open on the axially-forward facing surface 46 of the second flange 40. The second portion 49 of the aperture 41 is open on the axially-aft facing surface 48 of the second flange 40.

The blade track segment 28 includes a shroud wall 50 and an attachment feature 52, as shown in FIGS. 3-5. The shroud wall 50 is arcuate and extends circumferential partway around the axis 11. The shroud wall 50 also extends a limited axial distance across the axis 11. The shroud wall 50 may extend beyond the second flange 40 in an axially aft direction.

The attachment feature 52 illustratively includes a first attachment flange 54 and a second attachment flange 56 axially spaced apart from the first attachment flange 54, as shown in FIGS. 3-5. The attachment flanges 54, 56 extend radially outward from the shroud wall 50. The attachment flanges 54, 56 are formed to include corresponding holes 55, 57 that receive the first pin 32 when the first pin 32 is inserted into the carrier segment 26 and through the blade track segment 28. The first attachment flange 54 may extend radially away from the shroud wall 50 the same distance as the second attachment flange 56. The first attachment flange 54 and the second attachment flange 56 provide structure for coupling the blade track segment 28 to the carrier segment 26.

The first attachment flange 54 extends radially outwardly such that the first attachment flange 54 is located axially between the first flange 38 and the third flange 42 of the carrier segment 26, as shown in FIGS. 4 and 5. The hole 55 extends entirely axially through the first attachment flange 54. The second attachment flange 56 extends radially outwardly such that the second attachment flange 56 is located axially between the fourth flange 44 and the second flange 40 of the carrier segment 26. The hole 57 extends entirely axially through the second attachment flange 56.

The first pin 32 of the mount assembly 30 extends into the aperture 41 formed in the second flange 40, through the hole 57 formed in the second attachment flange 56, through the apertures 43, 45 formed in the third and fourth flanges 42, 44, through the hole 55 formed in the first attachment flange 54, and into the aperture 39 formed in the first flange 38, as shown in FIG. 5. An aftmost end of the first pin 32 is located in the first portion 47 of the aperture 41 of the second flange 40. The first pin retention plug 34 is located in the second portion 49 of the aperture 41 such that the first pin retention plug 34 engages the aftmost end of the first pin 32.

The first pin retention plug 34 is press fit or interference fit in the second portion 49 of the aperture 41 axially aft of the first pin 32 to block removal of the first pin 32 through the aperture 41 and to block or minimize axial movement of the first pin 32, as shown in FIG. 5. The first pin retention plug 34 also restricts the flow of air through the aperture 41 formed in the carrier segment 26 for the first pin 32. The engagement of the carrier segment 26 and the first pin retention plug 34 creates a seal and reduces air leakage from the cavity between the carrier segment 26 and the blade track segment 28.

In some embodiments, the first pin retention plug 34 comprises metallic materials. The first pin retention plug 34 has a circular cross-sectional shape. The first pin retention plug 34 has a diameter greater than a diameter of the first pin 32. The first pin retention plug 34 has a diameter substantially similar to the second diameter of the second portion 49 of the aperture 41. The first pin 32 has a diameter substantially similar to the first diameter of the first portion 47 of the aperture 41. In this way, an axially-aft facing surface 51 of the second portion 49 of the aperture 41 acts as a stop while the first pin retention plug 34 is press fit in the aperture 41. The first pin retention plug 34 is located entirely within the second portion 49 of the aperture 41.

The first pin retention plug 34 extends between a first axial end 34A and a second axial end 34B opposite the first axial end 34A, as shown in FIG. 5. The first axial end 34A abuts, confronts, contacts, or engages the first pin 32 and/or the axially-aft facing surface 51 of the second portion 49 of the aperture 41. The second axial end 34B defines an aftmost surface of the first pin retention plug 34. As shown in FIG. 3, the second axial end 34B is axially aligned with the axially-aft facing surface 48 of the second flange 40 of the carrier segment 26. In other words, the second axial end 34B is substantially flush with the axially-aft facing surface 48. In this way, the first pin retention plug 34 does not extend axially aft beyond the second flange 40 (i.e., beyond the axially-aft facing surface 48 of the second flange 40). No other component, head, portion, or extension is coupled to the second axial end 34B to extend axially aft away therefrom in the illustrative embodiment.

The first pin retention plug 34 defines an outer surface 34C that extends axially between the first axial end 34A and the second axial end 34B thereof, as shown in FIGS. 5 and 6. The outer surface 34C has a substantially uniform radial distance from a center point of the first pin retention plug 34 along an axial length thereof. In other words, the first pin retention plug 34 has a constant diameter along the axial length of the first pin retention plug 34. In this way, no other component, head, portion, or extension is coupled to the outer surface 34C to extend radially away therefrom in the illustrative embodiment. The outer surface 34C defines a radially outermost surface of the first pin retention plug 34 relative to the center point of the first pin retention plug 34.

The first pin retention plug 34 is formed to include a removal aperture 58 that extends axially into the first pin retention plug 34 from the second axial end 34B thereof toward the first axial end 34A, as shown in FIGS. 3 and 5. The removal aperture 58 does not extend entirely axially through the first pin retention plug 34. The removal aperture 58 is formed to include threads 58T to aid in removal of the first pin retention plug 34 from the aperture 41. For example, to remove the first pin retention plug 34 from the second portion 49 of the aperture 41, a removal tool having corresponding threads may be inserted into the removal aperture 58 and rotated such that the threads 58T of the removal aperture 58 mate with the corresponding threads of the removal tool. Then, the removal tool may be pulled axially aft to remove the first pin retention plug 34 from the aperture 41. The first pin retention plug 34 may then be replaced, the first pin 32 may be removed, and/or the first pin 32 may be replaced.

In the illustrative embodiment, the first pin 32 includes a forward pin segment 60 and an aft pin segment 62, as shown in FIGS. 4-6. The forward pin segment 60 and the aft pin segment 62 are circumferentially aligned. The forward pin segment 60 is located axially forward of the aft pin segment 62. The forward pin segment 60 is in direct confronting relation with the aft pin segment 62, while remaining separate from the aft pin segment 62. In this embodiment, the forward pin segment 60 is separate from the aft pin segment 62 so as to allow for independent loading during use in the gas turbine engine 10. The independent loading of the pin segments 60, 62 accommodates manufacturing tolerances and increases the number of loading points for the blade track segment 28. The increased number of loading points decreases localized stresses in the turbine shroud assembly 22.

The forward pin segment 60 extends through the third flange 42, the first attachment flange 54, and into the first flange 38, as shown in FIG. 5. The aft pin segment 62 extends through the second flange 40, the second attachment flange 56, and the fourth flange 44. In the embodiments where the first pin 32 is a split pin with the forward pin segment 60 and the aft pin segment 62 as suggested in FIG. 6, the first pin retention plug 34 engages an aftmost end of the aft pin segment 62.

The first pin 32 (i.e., the forward pin segment 60 and the aft pin segment 62) may have a circular cross-sectional shape or may have any other suitable cross-sectional shape. In other embodiments, the first pin 32 is formed as a single pin.

In the illustrative embodiment, the mount assembly 30 includes the first pin 32 and a second pin 64, as shown in FIG. 6. The mount assembly 30 further includes the first pin retention plug 34 and a second pin retention plug 66. The second pin retention plug 66 is circumferentially aligned with the second pin 64. The first pin 32 and the second pin 64 are spaced apart circumferentially from each other, and the first pin retention plug 34 and the second pin retention plug 66 are spaced apart circumferentially from each other.

The second pin 64 extends axially into an aperture 68 of the second flange 40 that is circumferentially spaced apart from the aperture 41, as shown in FIGS. 3 and 6. The second pin 64 extends into the aperture 68 formed in the second flange 40 of the carrier segment 26, through the first attachment flange 54 and the second attachment flange 56, through the third and fourth flanges 42, 44, and into the first flange 38 of the carrier segment 26 so as to couple the blade track segment 28 to the carrier segment 26. The second pin retention plug 66 is press fit or interference fit into the aperture 68 of the second flange 40 axially aft of the second pin 64 and circumferentially aligned with the second pin 64 to block removal of the second pin 64 through the aperture 68 in the second flange 40.

The second pin 64 and the second pin retention plug 66 are substantially similar to the first pin 32 and the first pin retention plug 34, respectively, in the illustrative embodiment. The second pin 64 and the second pin retention plug 66 are substantially similar to the first pin 32 and the first pin retention plug 34, respectively, such that description of the first pin 32 and the first pin retention plug 34 also applies to the second pin 64 and the second pin retention plug 66, respectively.

A method of assembling the turbine shroud assembly 22 may include several steps. The method begins by arranging the blade track segment 28 adjacent the carrier segment 26 so that the first and second attachment flanges 54, 56 of the attachment feature 52 are adjacent the carrier segment 26. The blade track segment 28 is arranged adjacent the carrier segment 26 so that the first attachment flange 54 is located axially between the first flange 38 and the third flange 42 and the second attachment flange 56 is located axially between the second flange 40 and the fourth flange 44. The blade track segment 28 is arranged adjacent the carrier segment 26 so that the holes 55, 57 in the attachment flanges 54, 56 align with the apertures 39, 41, 43, 45 in the flanges 38, 40, 42, 44 of the carrier segment 26.

Then, each of the pins 32, 64 is inserted into the carrier segment 26 and through the blade track segment 28 in an axial forward direction. Each of the pins 32, 64 is first inserted through the second flange 40, through the second attachment flange 56 of the blade track segment 28, through the third and fourth flanges 42, 44, through the first attachment flange 54 of the blade track segment 28, and into the first flange 38. Specifically, the first pin 32 is inserted through the aperture 41 in the second flange 40, through the hole 57 in the second attachment flange 56, through the apertures 43, 45 of the third and fourth flanges 42, 44, through the hole 55 of the first attachment flange 54, and into the aperture 39 of the first flange 38. In this way, the blade track segment 28 is coupled to the carrier segment 26.

Once the pins 32, 64 are inserted, the method includes inserting the corresponding pin retention plug 34, 66 into the corresponding aperture 41, 68 of the second flange 40 of the carrier segment 26. The pin retention plugs 34, 66 are inserted into the apertures 41, 68 until the first axial end 34A of the pin retention plugs 34, 66 engage the axially aft end of the pins 32, 64 and/or the axially-aft facing surface 51 of the second portion 49 of the aperture 41, 68.

In some embodiments, the method includes removing one or both of the pin retention plugs 34, 66. To do so, the removal tool may be inserted into the removal aperture 58 and rotated such that the threads 58T of the removal aperture 58 mate with the corresponding threads of the removal tool. Then, the removal tool may be pulled axially aft to remove the pin retention plug 34, 66 from the aperture 41, 68.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising:

a carrier segment arranged to extend circumferentially at least partway around an axis, the carrier segment including an outer wall, a first flange that extends radially inward from the outer wall, and a second flange spaced apart axially aft from the first flange and extending radially inward from the outer wall, a blade track segment supported by the carrier segment to define a portion of a gas path of the turbine shroud assembly, the blade track segment including a shroud wall that extends circumferentially partway around the axis, a first attachment flange that extends radially outward from the shroud wall, and a second attachment flange axially spaced apart from the first attachment flange and extending radially outward from the shroud wall, and a mount assembly including a first pin that extends axially into a first aperture formed in the second flange of the carrier segment, through the first attachment flange and the second attachment flange, and into the first flange of the carrier segment so as to couple the blade track segment to the carrier segment and a first pin retention plug that is press fit into the first aperture of the second flange of the carrier segment axially aft of the first pin and circumferentially aligned with the first pin to block removal of the first pin through the first aperture in the second flange, wherein the first pin retention plug extends between a first axial end that abuts the first pin and a second axial end opposite the first axial end, and wherein the first pin retention plug is formed to include a removal aperture that extends into the first pin retention plug from the second axial end thereof toward the first axial end, wherein the removal aperture of the first pin retention plug is formed to include threads to aid in removal of the first pin retention plug from the first aperture, wherein the removal aperture does not extend entirely axially through the first pin retention plug.

2. The turbine shroud assembly of claim 1, wherein the first pin retention plug has a constant diameter along an axial length of the first pin retention plug.

3. The turbine shroud assembly of claim 1, wherein the first pin retention plug has a circular cross-sectional shape.

4. The turbine shroud assembly of claim 1, wherein the first pin includes a forward pin segment that extends axially into the first flange of the carrier segment and through the first attachment flange and an aft pin segment that extends through the second attachment flange and the second flange of the carrier segment.

5. The turbine shroud assembly of claim 4, wherein the carrier segment further includes a third flange located axially between the first flange and the second flange and extending radially inward from the outer wall and a fourth flange located axially between the third flange and the second flange and extending radially inward from the outer wall, and wherein the forward pin segment extends through the third flange and the aft pin segment extends through the fourth flange.

6. The turbine shroud assembly of claim 4, wherein the forward pin segment and the aft pin segment are separate from one another so as to allow for independent loading.

7. The turbine shroud assembly of claim 1, wherein the first aperture is defined by a first portion and a second portion axially aft of the first portion, and wherein the first portion has a first diameter and the second portion has a second diameter that is greater than the first diameter.

8. The turbine shroud assembly of claim 7, wherein the first pin is located in the first portion of the first aperture and the first pin retention plug is located in the second portion of the first aperture.

9. The turbine shroud assembly of claim 1, wherein the mount assembly further including a second pin that extends axially into a second aperture formed in the second flange of the carrier segment, through the first attachment flange and the second attachment flange, and into the first flange of the carrier segment so as to couple the blade track segment to the carrier segment and a second pin retention plug that is press fit into the second aperture of the second flange of the carrier segment axially aft of the second pin and circumferentially aligned with the second pin to block removal of the second pin through the second aperture in the second flange, and wherein the second pin and the second pin retention plug are circumferentially spaced apart from the first pin and the first pin retention plug, respectively.

10. A turbine shroud assembly for use with a gas turbine engine, the turbine shroud assembly comprising:

a carrier segment including an outer wall, a first flange that extends radially inward from the outer wall, and a second flange spaced apart axially aft from the first flange and extending radially inward from the outer wall, a blade track segment supported by the carrier segment and including a shroud wall and an attachment feature that extends radially outward from the shroud wall, and a mount assembly including a pin that extends axially into an aperture formed in the second flange of the carrier segment, through the attachment feature, and into the first flange of the carrier segment so as to couple the blade track segment to the carrier segment and a pin retention plug that is press fit into the aperture of the second flange of the carrier segment axially aft of the pin and circumferentially aligned with the pin to block removal of the pin through the aperture in the second flange, wherein the pin retention plug extends between a first axial end facing the pin and a second axial end opposite the first axial end, and wherein the pin retention plug is formed to include a removal aperture that extends into the pin retention plug from the second axial end thereof toward the first axial end, wherein the removal aperture of the pin retention plug is formed to include threads to aid in removal of the pin retention plug from the aperture, wherein the removal aperture does not extend entirely axially through the pin retention plug.

11. The turbine shroud assembly of claim 10, wherein the pin retention plug has a constant diameter along an axial length of the pin retention plug.

12. The turbine shroud assembly of claim 10, wherein the attachment feature of the blade track segment includes a first attachment flange that extends radially outward from the shroud wall and a second attachment flange axially spaced apart from the first attachment flange and extending radially outward from the shroud wall.

13. The turbine shroud assembly of claim 12, wherein the pin includes a forward pin segment that extends axially into the first flange of the carrier segment and through the first attachment flange and an aft pin segment that extends through the second attachment flange and the second flange of the carrier segment.

14. The turbine shroud assembly of claim 13, wherein the carrier segment further includes a third flange located axially between the first flange and the second flange and extending radially inward from the outer wall and a fourth flange located axially between the third flange and the second flange and extending radially inward from the outer wall, and wherein the forward pin segment extends through the third flange and the aft pin segment extends through the fourth flange.

15. The turbine shroud assembly of claim 13, wherein the forward pin segment and the aft pin segment are separate from one another so as to allow for independent loading.

16. A method comprising:

arranging a blade track segment adjacent a carrier segment to support the blade track segment radially inward of the carrier segment, the carrier segment including an outer wall, a first flange that extends radially inward from the outer wall, and a second flange spaced apart axially aft from the first flange and extending radially inward from the outer wall, the blade track segment including a shroud wall, a first attachment flange that extends radially outward from the shroud wall, and a second attachment flange axially spaced apart from the first attachment flange and extending radially outward from the shroud wall, inserting a pin into an aperture of the second flange, through the second attachment flange, through the first attachment flange, and into the first flange so as to couple the blade track segment to the carrier segment, and inserting a pin retention plug into the aperture aft of the pin after inserting the pin to block removal of the pin through the aperture of the second flange, wherein the pin retention plug extends between a first axial end that abuts the pin and a second axial end opposite the first axial end, and the pin retention plug is formed to include a removal aperture that extends into the pin retention plug from the second axial end thereof toward the first axial end, the removal aperture of the pin retention plug being formed to include threads, and wherein the removal aperture does not extend entirely axially through the pin retention plug.

17. The method of claim 16, wherein inserting the pin into the aperture includes inserting a forward pin segment into the aperture and inserting an aft pin segment into the aperture after inserting the forward pin segment into the aperture, and wherein the forward pin segment and the aft pin segment are separate from one another.

* * * * *